United States Patent
Mehra

(10) Patent No.: US 8,607,203 B1
(45) Date of Patent: Dec. 10, 2013

(54) TEST AUTOMATION FRAMEWORK USING DEPENDENCY INJECTION

(75) Inventor: Nitin Mehra, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 329 days.

(21) Appl. No.: 12/972,399

(22) Filed: Dec. 17, 2010

(51) Int. Cl.
  *G06F 9/44* (2006.01)

(52) U.S. Cl.
  USPC ............ 717/131; 717/124; 717/130; 717/132

(58) Field of Classification Search
  None
  See application file for complete search history.

(56) References Cited

U.S. PATENT DOCUMENTS

| | | | |
|---|---|---|---|
| 5,673,387 A * | 9/1997 | Chen et al. | 714/38.1 |
| 6,895,578 B1 * | 5/2005 | Kolawa et al. | 717/130 |
| 7,490,319 B2 * | 2/2009 | Blackwell et al. | 717/124 |
| 7,536,600 B2 * | 5/2009 | Fay et al. | 714/37 |
| 7,685,576 B2 * | 3/2010 | Hartmann et al. | 717/132 |
| 7,844,955 B2 * | 11/2010 | Tateishi et al. | 717/131 |
| 8,434,069 B2 * | 4/2013 | Chandra | 717/135 |
| 2005/0166094 A1 * | 7/2005 | Blackwell et al. | 714/38 |
| 2005/0172306 A1 * | 8/2005 | Agarwal et al. | 719/328 |
| 2005/0273767 A1 * | 12/2005 | Achlioptas et al. | 717/132 |
| 2006/0143596 A1 * | 6/2006 | Miyashita et al. | 717/131 |
| 2006/0206869 A1 * | 9/2006 | Lewis et al. | 717/124 |
| 2006/0265172 A1 * | 11/2006 | Basham et al. | 702/117 |
| 2007/0033441 A1 * | 2/2007 | Sathe et al. | 714/38 |
| 2007/0198970 A1 * | 8/2007 | Horii et al. | 717/124 |
| 2007/0234293 A1 * | 10/2007 | Noller et al. | 717/124 |
| 2008/0040708 A1 * | 2/2008 | Blancha et al. | 717/130 |
| 2008/0163015 A1 * | 7/2008 | Kagan et al. | 714/724 |
| 2008/0270998 A1 * | 10/2008 | Zambrana | 717/131 |
| 2008/0276231 A1 * | 11/2008 | Huang et al. | 717/145 |
| 2009/0150871 A1 * | 6/2009 | Fong et al. | 717/130 |
| 2009/0217248 A1 * | 8/2009 | Bently et al. | 717/132 |
| 2009/0254312 A1 * | 10/2009 | Kube et al. | 702/186 |
| 2010/0242028 A1 * | 9/2010 | Weigert | 717/131 |
| 2011/0131451 A1 * | 6/2011 | Bosch | 714/33 |

OTHER PUBLICATIONS

Xiaoying Bai, WSDL-Based Automatic Test Case Generation for Web Services Testing, 2005, pp. 1-5.*
Il-Chul Yoon, Direct-Dependency-based Software Compatibility Testing, 2007, pp. 1-4.*
Kari Seguin, Introducing Dependency Injection Frameworks, 2007, pp. 1-5.*

* cited by examiner

*Primary Examiner* — Thuy Dao
*Assistant Examiner* — Mongbao Nguyen
(74) *Attorney, Agent, or Firm* — Lowenstein Sandler LLP

(57) ABSTRACT

A method for testing software may include receiving a user request to run a test, and identifying a test flow document associated with the test. The test flow document may specify a plurality of test steps and define a test flow for the test. Each of the plurality of test steps may correspond to an independently-compiled set of instructions. The method may further include executing the plurality of test steps using dependency injection provided in accordance with the defined test flow.

22 Claims, 8 Drawing Sheets

```
402
<bean id="Call_Usage_Report_Service_By_Year_2010_TV04"
      class="com.qa.service.kuts.teststeps.CallService_Kurs_GetUsageReportForYear"
404   parent="BaseStep"
>
    <property name="parameters">
        <map>
            <entry key="vendorId" value="TV04" />
406     <entry key="yearToSet" value="2010" />
        </map>
    </property>
</bean>
```

422 ─ <bean id="GetUsageReportByYearAsFileSingleAppId"
         class="com.qa.framework.impl.StandardTestScript"
424      parent="BaseScript"
      >
         <property name="testSteps">
            <list>
               <ref
426         bean="Delete_Entry_From_Downloads_Cache_By_Device_Type_RBM" />
               <ref
428         bean="Delete_Entry_From_Product_Revenue_Hour_By_Application_ID_TestApp0301" />
               <ref
430         bean="Persist_Valid_Records_In_Downloads_Cache_Table_TV03_2010" />
               <ref
432         bean="Wait_For_Five_Seconds" />
               <ref
434         bean="Call_Usage_Report_Service_By_Year_AsFile_2010_TV03" />
               <ref
436         bean="Verify_Usage_Report_As_File_SingleAppId" />
               <ref
426         bean="Delete_Entry_From_Downloads_Cache_By_Device_Type_RBM" />
            </list>
         </property>
      </bean>
```

FIG. 4B

TEST AUTOMATION FRAMEWORK USING DEPENDENCY INJECTION

BACKGROUND

In order for software to operate properly, it has to be tested using various scenarios. Typically, a test team member (e.g., quality assurance (QA) engineer) creates a test for a specific scenario by writing code that calls various services, checks data generated by the services and passes the data between the services. Once the code for the test is written, the test team member compiles it and then deploys it for execution by a test engine. If the flow of the test changes or a particular service is modified, the test team member needs to re-write the test code, re-compile it and then re-deploy it for execution by the test engine. Hence, even an insignificant test change results in a tedious and time-consuming process.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4A illustrates an exemplary XML file describing a test step in accordance with one embodiment of the invention.

FIG. 4B illustrates an exemplary XML file describing a test flow of a test in accordance with one embodiment of the invention.

DETAILED DESCRIPTION

Methods and systems for testing software functionality using dependency injection are described herein. Software being tested may include applications or services operating in a client-server environment, a cloud computing environment, a grid computing environment, a peer-to-peer environment, etc. When testing an application, a test team member (e.g., a QA engineer) may identify test steps needed for a test and create a test flow document (e.g., an XML document) specifying the test steps and defining the flow for executing the test steps. Each test step may correspond to an independently complied set of instructions (e.g., a compiled module or service). When a QA engineer submits a request to run a test, a corresponding test flow document is identified and passed to a test engine. The test engine then automatically runs the test by identifying test steps specified in the test flow document and executing the test steps using dependency injection provided in accordance with the test flow defined in the test flow document.

If the test changes (e.g., a test step needs to be added, removed or modified, or the execution order needs to be updated), the QA engineer modifies the test flow document and issues a request to rerun the test. The test engine then re-runs the test using the modified test flow document without requiring the QA engineer to re-compile the new test flow and re-deploy the resulting code.

By using dependency injection, embodiments of the invention provide a test automation framework that completely separates components performing specific functions from their execution order and dependencies needed for a particular test. As a result, individual components can be easily reused in different tests or re-executed in a single test, and tests can be built and modified using a significantly more efficient and simpler process.

Figure 1:
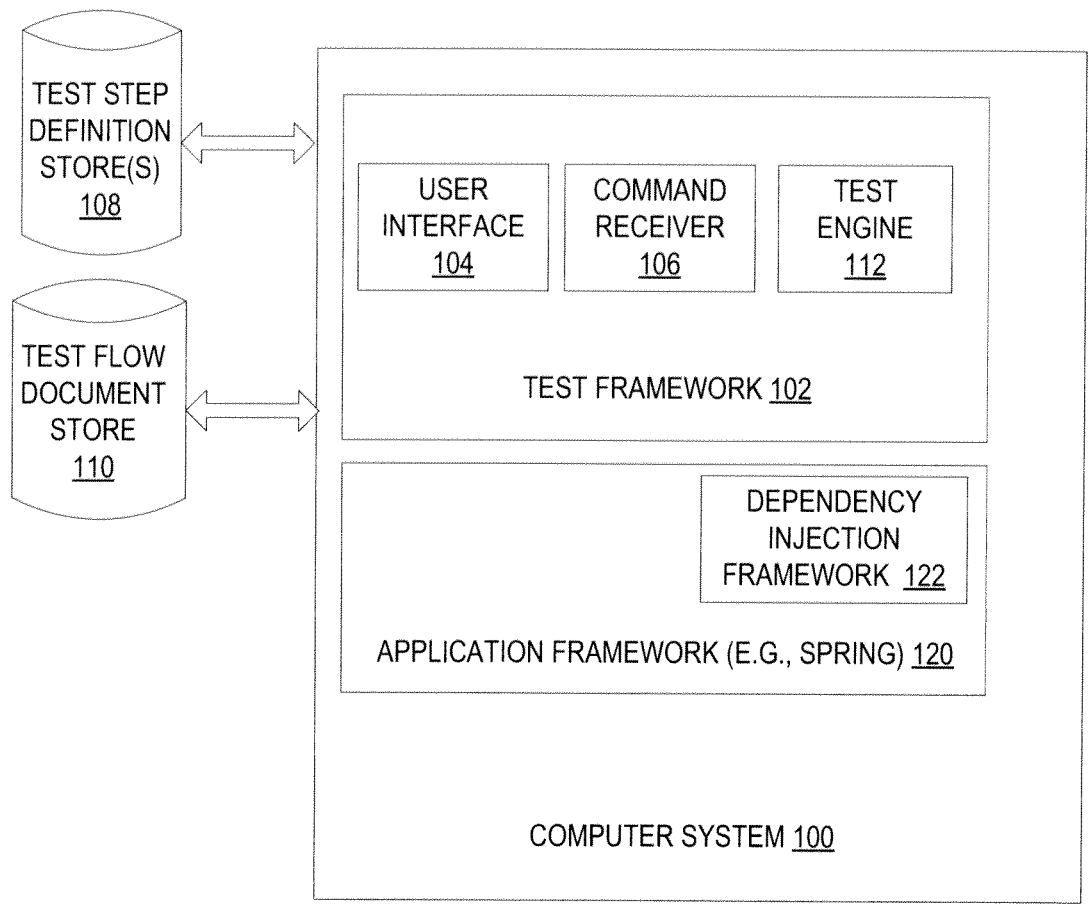
FIG. 1 is a block diagram of one embodiment of a system for testing software functionality using dependency injection.

FIG. 1 is a block diagram of one embodiment of a computer system 100 for testing software functionality using dependency injection. The computer system 100 may include a base hardware platform that comprises a computing platform, which may be capable, for example, of working with a standard operating system. An exemplary base hardware platform will be discussed in more detail below in conjunction with FIG. 7. The computer system 100 may be, for example, an electronic book reader, a portable digital assistant, a mobile phone, a laptop computer, a portable media player, a netbook, a notebook, a desktop computer, a media center, a cloud server, a content provider server, a web server. Generally speaking, the computer system 100 may be a client machine hosting applications that request services from servers, a server machine hosting applications that provide services to clients, a peer-to-peer node hosting applications that both provide services to and request services from other nodes, a grid computing machine hosting applications that perform large tasks in concert with other machines, and a cloud computing machine hosting applications that communicate with other cloud components to provide resources (e.g., virtualized resources) to other computers.

The computer system 100 hosts a test framework 102 that enables testing of software functionality provided by applications/services running on the computer system 100 and/or other machines coupled with the computer system 100 via a network (e.g., a private network such as LAN or a public network such as Internet). The test framework 102 runs on top of an application framework 120 that provides code solutions to common programming problems and a virtual machine to manage the execution of code written for the application framework 120. In one embodiment, the application framework 120 (e.g., Spring framework, .NET framework, Guice framework) includes a dependency injection framework 122 that supports dependency injection. Dependency injection can be defined as a technique in object-oriented programming that indicates to one component (e.g., a part of a program) which other components (e.g., other parts of the program) it can use, thus separating behavior from dependency resolution and decoupling highly dependent components. The application framework 120 may be operable, for example, with Java, C, C++, Perl.

As aforementioned, the test framework 102 is built on the application framework 120 to provide an environment for the user (e.g., software developers/administrators) to perform software testing. The test framework 102 may be TestNG, JUnit or any other test framework. In one embodiment, the user identifies steps that need to be performed to test a specific scenario. The user may write and compile new code for a test step or use existing pre-compiled code written by this or other users and stored in one or more test step stores 108. The test steps stores 108 may be part of the computer system 100 and/or other machines coupled to the computer system 100 over the network. In one embodiment, the test framework 102 maintains a list of available test steps created by different users and different teams of users. The list may include identifiers (e.g., names) of test steps and their locations. When a user creates a new test step, the user may add this test to the list and specify the location of the test step. In one embodiment, the test framework 102 provides a user interface 104 that allows a user to view available test steps, select a desired test step or add a new test step.

The user may then create a test flow document specifying the test steps and defining the flow for executing the test steps. The test flow document may be stored as an XML file or any flat file (e.g., a text file) in a test flow document store 110, which may reside on the computer system 100 or remotely. The test flow document store 110 and test step store(s) 108 may represent a single data structure or multiple data structures (databases, repositories, files, etc.) residing on one or more mass storage devices, such as magnetic or optical storage based disks, solid-state drives or hard drives.

The test flow specified in a test flow document may define the execution order of the test steps and dependencies between the test steps (e.g., whether a test step has to be executed in parallel with other test steps, or whether the execution of a test step depends on the result of another test step). The test flow may require that a test step be executed multiple times during the test. In one embodiment, the user interface 104 assists users in creating new test flow documents and modifying existing test flow documents.

In one embodiment, the test framework 102 includes a command receiver 106 and a test engine 112. The command receiver 106 may receive a user request to run a test, identify a test flow document associated with the test, and pass the test flow document to the test engine 112. The test engine 112 may be specified in the test flow document or in the user request, or be predefined for the current user, the team of the current user, the type of the requested test, etc. The test framework 102 may include multiple test engines 106 designated to run different types of tests (e.g., sequential execution of test steps or parallel execution of test steps) or be requested by different users.

The test engine 112 automatically runs the test by identifying test steps specified in the test flow document and executing the test steps using dependency injection provided in accordance with the test flow defined in the test flow document. In one embodiment, the test engine 112 runs the test by creating a test object on the fly (dynamically in response to the user request to run the test) using test dependencies identified by the dependency injection framework 122, and executing the test steps in accordance with the dependencies. The test engine 106 may provide the test results to the user as a report or via the user interface 104.

If the test requirements change (e.g., a test step needs to be added, removed or modified, or the execution order needs to be updated), the user can modify the test flow document and issue a request to rerun the test. The test engine 112 may then re-run the test using the modified test flow document without requiring the user to re-compile the new test flow and re-deploy the resulting code. In addition, if the user decides to use a different test engine for the test, the user may specify the different test engine in the test flow document or in the request, and the command receiver 206 will pass the test flow document to the different test engine, without requiring the user to recompile any code. Hence, the test framework 102 completely decouples what is being tested from the test engine.

Figure 2:
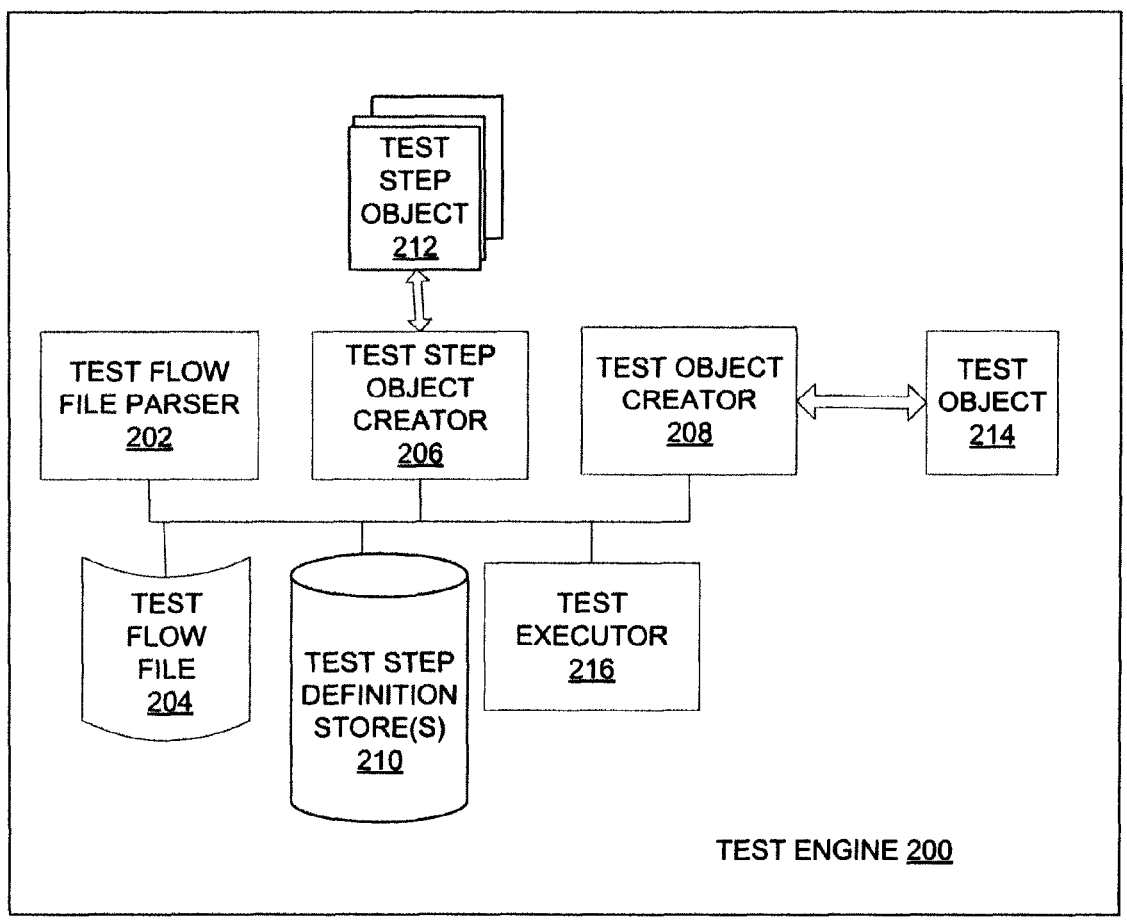
FIG. 2 is a block diagram of one embodiment of a test engine.

FIG. 2 is a block diagram of one embodiment of a test engine 200. The test engine 200 may be the same as the test engine 112 of FIG. 1. In one embodiment, the test engine 200 includes a test flow file parser 202, a test step object creator 206, a test object creator 208, a test executor 216, and a test step definition store 210. The above components can be combined together or separated into further components, according to some embodiments.

The test step definition store 210 stores definitions of test steps. A test step definition may be a document stored as an xml file or a flat file and may include the identifier (e.g., the name) of a test step, the location of the compiled code (e.g., a module or a service) for the test step, and input and/or output parameters for the test step if any.

The test flow parser 202 receives a test flow file 204 for a test to be executed in response to a user request, and parses the test flow file 204 to identify test steps required for the test. The test flow file 204 defines the flow of the test using plain data. As opposed to source code or script data, the content of the test flow file 204 is created without the use of any programming or scripting language and does not need to be complied or interpreted by a designated compiler or interpreter. The test step object creator 206 retrieves definitions of the identified test steps from the test step definition store 210, creates a test step object 212 for each test step using a corresponding test step definition, and passes the test step objects 212 to the test object creator 208. In one embodiment, the test step object creator 206 creates a test step object 212 by calling the dependency injection framework 122 to identify the dependencies associated with the test step and injecting them into the test step object. The test object creator 208 creates a test object 214 for the test using the dependency injection framework 122 that identifies the dependencies of the test with respect to the test step objects and injects dependencies of the test into the test object 214. The test executor 216 calls the test step services for execution using the injected dependencies.

Figure 3:
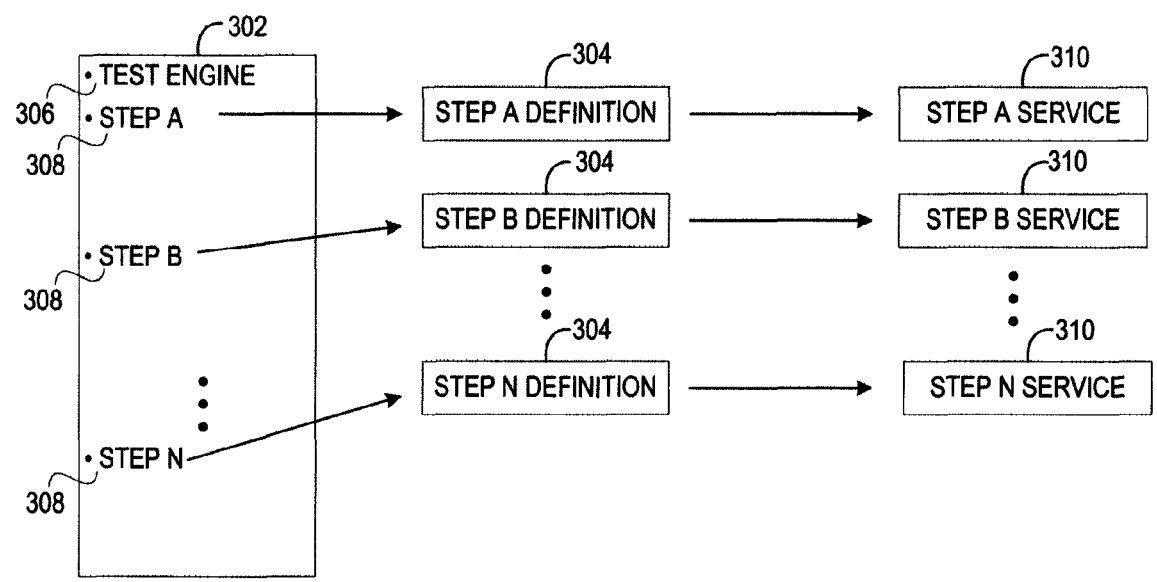
FIG. 3 illustrates operation of a test framework in accordance with one embodiment of the invention.

FIG. 3 illustrates operation of a test framework in accordance with one embodiment of the invention. In response to a user request to run a test, the test framework identifies a test flow document 302 associated with the test. The test flow document 302 includes an identifier 306 of a test engine for running the test and identifiers 308 of test steps required for the test. The test flow document 302 may also specify the location of the test engine, the location of each test step definition and dependencies between the test steps (e.g., whether a test step has to be executed in parallel with other test steps, or whether the execution of a test step depends on the result of another test step). In one embodiment, the test flow document 302 is a Spring bean xml file, as will be discussed in more detail below in conjunction with FIG. 4B.

Each test step identifier 308 refers to a definition of a test step (step definition 304). In one embodiment, the test step definition document 304 is a Spring bean xml file, as will be discussed in more detail below in conjunction with FIG. 4A. Test step definition documents 304 may reside on the same or different machine and may provide a reference to compiled code (e.g., a service) 310 of the test step, the location of the compiled code and input and/or output parameters of the service step if any. The test steps 310 may reside on one or more machines. For example, the test steps 310 may be web services hosted by different machines. When running the test, the test engine may call external services for execution on their own host machines or it may cache the external services to the test engine's machine to execute them locally.

FIG. 4A illustrates an exemplary xml file 400 describing a test step in accordance with one embodiment of the invention. The xml file 400 has a JavaBean format. It specifies a service 402 and uses a test step class 404 that inherits the properties of a generic base step shared by all test steps in the xml file 400. The xml file 400 also specifies parameters that the service 402 requires. If needed, the parameters may be modified without recompiling the code of the service 402.

FIG. 4B illustrates an exemplary xml file 420 describing a test flow of a test in accordance with one embodiment of the invention. The xml file 420 has a JavaBean format. It specifies a test 422 and uses a test script class 424 that inherits from the generic base step. The xml file 400 also lists steps 426, 428, 430, 432, 434 and 436 that need to be executed for the test and leaves it up to the specific implementation of the test engine to decide the order in which the test steps are executed. As shown, step 426 has to be executed twice, and both executions can be independent of each other. Each time the specific test step is called, the same instance of the test bean can be used or a different instance of the test bean can be used. None of these test steps have any dependency on the previous step or on a given instance of itself and can be executed independently of each other. When needed, an xml config file (not shown) may also be provided to specify objects that needed to be passed into the test steps and test results that need to be passed to other test steps.

In one embodiment, in which the test framework is the TestNG framework, a test engine may create a TestNG file to reflect the test flow document 420. The test engine may then run the TestNG file individually or as a test suite.

Figure 5:
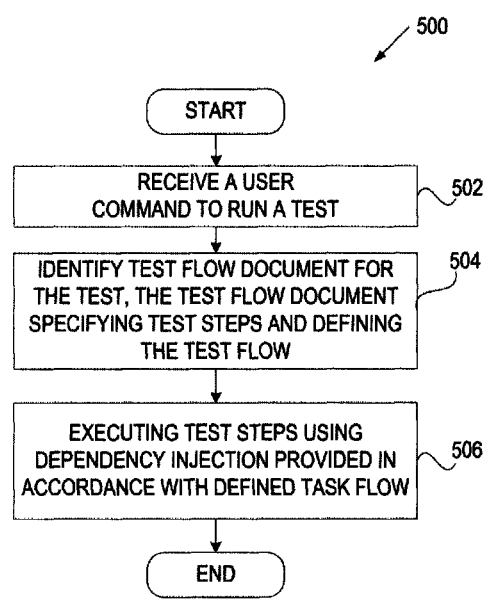
FIG. 5 is a flow diagram of one embodiment of a method for testing software functionality using a test flow document.

FIG. 5 illustrates a flow diagram of one embodiment of a method 500 for testing software functionality using a test flow document. The method 500 may be performed by processing logic that may comprise hardware (circuitry, dedicated logic, etc.), software (such as is run on a general purpose computer system or a dedicated machine), or a combination of both. In one embodiment, the method 500 is performed by a test framework (e.g., test framework 102 of FIG. 1).

Referring to FIG. 5, method 500 begins with the test framework receiving a user request to run a test (block 502). At block 504, the test framework identifies a test flow document associated with the test. The test framework may identify the test flow document by searching a test flow document store using the identifier (e.g., the name) of the test specified in the user request. The test flow document specifies test steps required for the test and defines the test flow for the test. Each test step corresponds to an independently-compiled set of instructions (e.g., a compiled program, module or service).

At block 506, the test framework invokes a test engine to automatically execute the steps of the test using dependency injection provided in accordance with the test flow defined in the test flow document. With dependency injection, the test engine is able to run the test without having any compiled code, except the code of individual test steps. One embodiment of a method for executing test steps using dependency injection will be discussed in more detail below in conjunction with FIG. 6.

If a user decides to change the flow of a test, the user may update a test flow document associated with the test and submit a request to re-run the test. The test engine will then re-run the test using the updated test flow document without requiring the user to recompile the code and redeploy the recompiled code. In addition, if the user decides to use a different test engine to run a test, the test framework will pass a test flow document associated with the test to the different test engine without requiring the user to recompile and redeploy any code.

Figure 6:
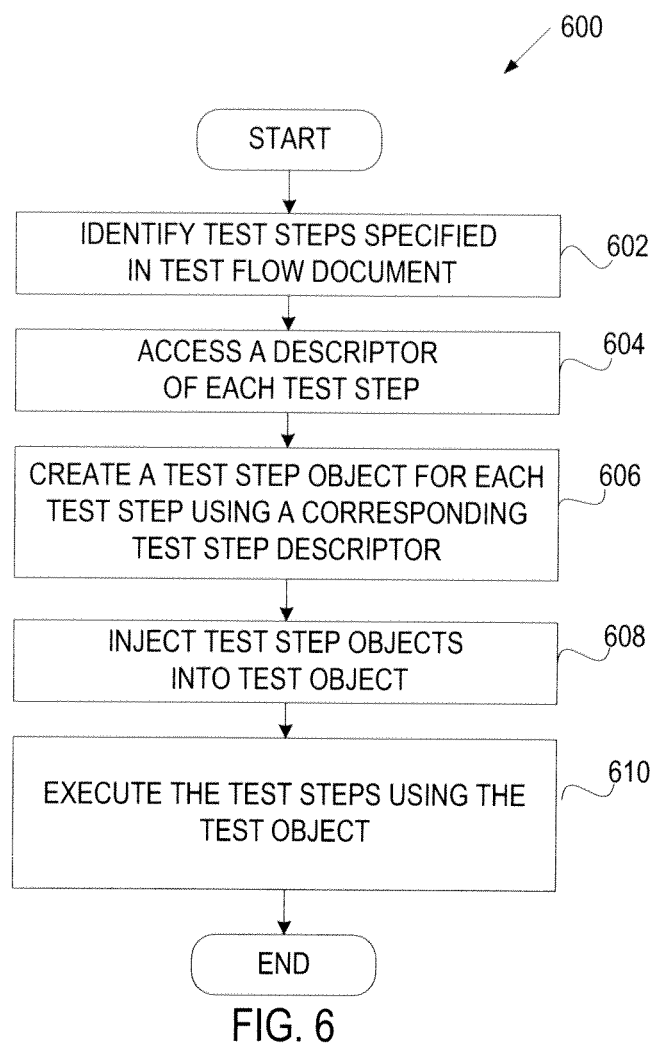
FIG. 6 is a flow diagram of one embodiment of a method for a method for executing test steps using dependency injection.

FIG. 6 illustrates a flow diagram of one embodiment of a method 600 for executing test steps using dependency injection. The method 600 may be performed by processing logic that may comprise hardware (circuitry, dedicated logic, etc.), software (such as is run on a general purpose computer system or a dedicated machine), or a combination of both. In one embodiment, the method 600 is performed by a test engine (e.g., a test engine 112 of FIG. 1).

Referring to FIG. 6, method 600 begins with the test engine identifying test steps specified in a test flow document associated with a test (block 602). In one embodiment, the test flow document is an xml file that specifies the test steps for the test and defines the test flow of the test using the JavaBeans format.

At block 604, the test engine accesses a test step descriptor for each test step specified in the test flow document. In one embodiment, the test engine finds a test step descriptor of a test by searching a test step definition store using the test step identifier specified in the test flow document. In one embodiment, the test step descriptor is an xml file that specifies a module or service associated with the test step and parameters of the test step using the JavaBeans format.

At block 606, the test engine creates a test step object for each of test step specified in the test flow document using a corresponding test step descriptor. At block 608, the test engine calls the dependency injection framework to inject the test steps objects into a test object dynamically created for the test. At block 610, the test engine executes the test steps using the test object.

Figure 7:
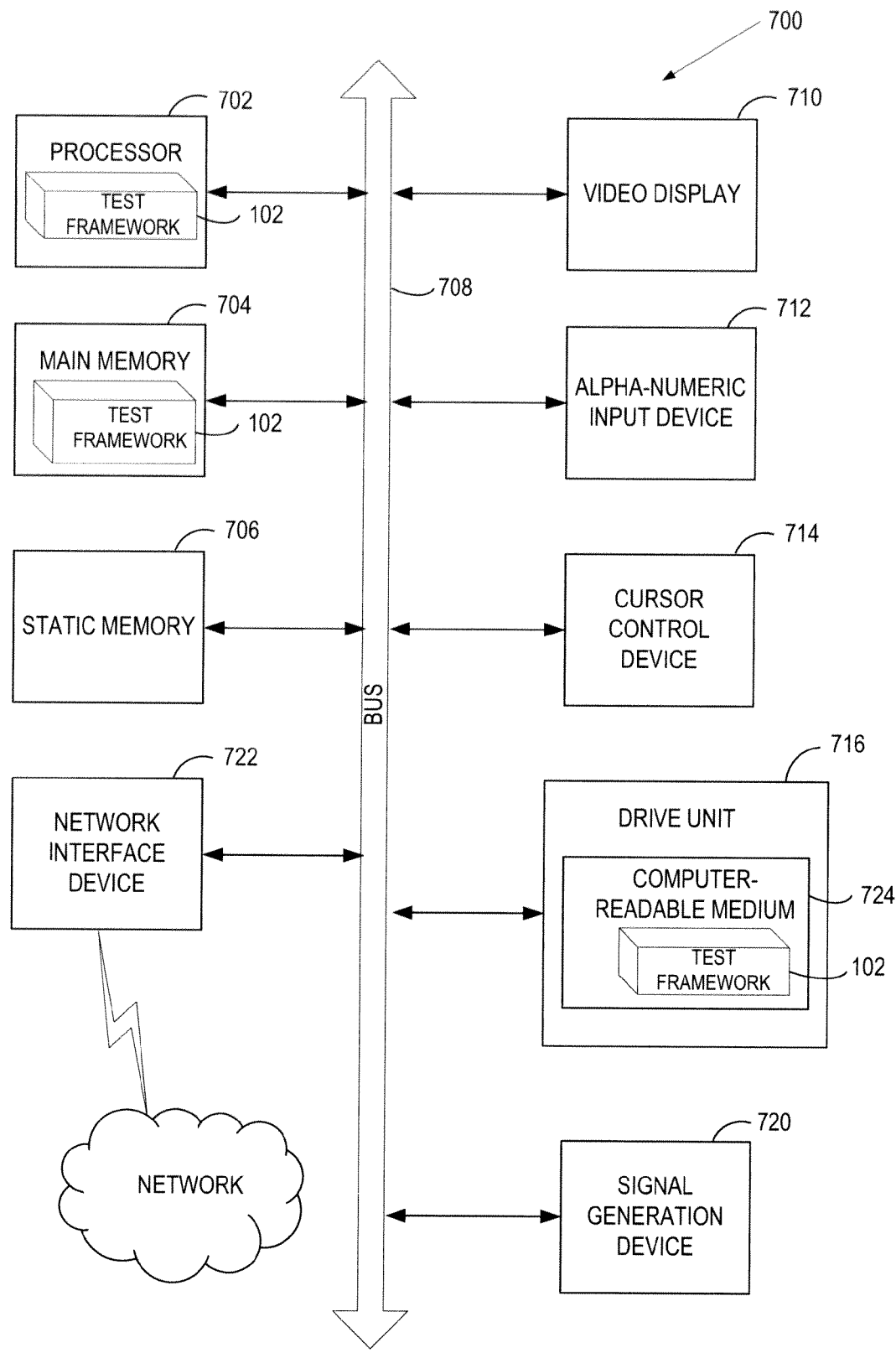
FIG. 7 illustrates an exemplary computer system providing a test automation framework.

FIG. 7 illustrates a test automation system 700 in the form of a machine within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server or client machine in client-server network environment, a peer node in peer-to-peer environment, a cloud machine in cloud computing environment, etc. The machine may be a personal computer (PC), a set-top box (STB), a server, a mobile computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 706.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the test server 106 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

A drive unit 716 may include a computer-readable medium 724 on which is stored one or more sets of instructions (e.g., instructions of the test framework 102) embodying any one or more of the methodologies or functions described herein. The instructions of the test framework 102 may also reside, completely or at least partially, within the main memory 704 and/or within the processor 702 during execution thereof by the computer system 700, the main memory 704 and the processor 702 also constituting computer-readable media. The instructions of the test framework 102 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "receiving", "executing", "adding" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computer system, comprising:
    receiving, by the computer system, a user request to run a test;
    identifying, by the computer system, a test flow document associated with the test, the test flow document specifying a plurality of test steps and defining a test flow for the test, each of the plurality of test steps corresponding to an independently-compiled set of instructions;
    determining, by the computer system, dependencies between the plurality of test steps using the test flow in the test flow document, wherein the dependencies comprise at least one of a parallel execution dependency indicating that a second test is to be executed in parallel with a first test or a sequential execution dependency indicating that the second test depends on a result of the first test; and
    executing, by the computer system, the plurality of test steps using dependency injection provided in accordance with the dependencies between the plurality of test steps.

2. The method of claim 1 wherein the test flow document is stored as an XML file.

3. The method of claim 1 further comprising:
    allowing a user to modify the test flow in the test flow document; and
    re-running the test according to the modified test flow without requiring a modified test flow document to be compiled.

4. The method of claim 1 further comprising:
    re-executing one of the plurality of test steps if the test flow document specifies the one of the plurality of steps more than once.

5. The method of claim 1 wherein executing the plurality of test steps using dependency injection comprises:

identifying the plurality of test steps specified in the test flow document;

creating a test step object for each of the plurality of test steps; and creating a test object for the test by injecting test step objects of the plurality of test steps into the test object, in accordance with test dependencies defined by the test flow in the test flow document.

6. The method of claim 1 wherein the test step object is created using a test step definition identifying a location of a compiled set of instructions for a corresponding test step and parameters of the corresponding test step.

7. The method of claim 6 wherein the test step definition is an xml file utilizing a JavaBean format.

8. The method of claim 5 further comprising:

maintaining a list of test step definitions created by a plurality of users and stored at a plurality of locations; and allowing a creator of the test flow document to include any test step definition from the list in the test flow document.

9. The method of claim 1 further comprising:

allowing a user to specify a different test engine in the test flow document; and re-running the test by the different test engine.

10. The method of claim 1 wherein the plurality of test steps are a plurality of web services hosted by different machines.

11. The method of claim 1 wherein the test is performed to test software functionally provided by at least one of a client device, a server, a peer-to-peer node, a grid computing resource and a cloud computing resource.

12. A non-transitory computer readable medium including instructions that, when executed by a processing system, cause the processing system to perform a method comprising:

receiving, by a test engine executing on the processing system, a flat file identifying a plurality of test steps of a test and a test flow for executing the plurality of the steps of the test, each of the plurality of test steps corresponding to a compiled set of instructions;

running the test by the test engine using the flat file, comprising executing the plurality of test steps using dependency injection provided in accordance with the test flow in the flat file;

receiving, by the test engine, the flat file identifying the plurality of test steps and a modified test flow of the test; and re-running the test by the test engine using the modified test flow, wherein the re-running of the test does not require any code recompilation.

13. The computer readable medium of claim 12 wherein the method further comprises:

re-executing one of the plurality of test steps if the flat file specifies the one of the plurality of steps more than once.

14. The computer readable medium of claim 12 wherein executing the plurality of test steps using dependency injection comprises:

identifying the plurality of test steps specified in the flat file;

creating a test step object for each of the plurality of test steps; and creating a test object for the test by injecting test step objects of the plurality of test steps into the test object, in accordance with test dependencies defined by the test flow in the flat file.

15. The computer readable medium of claim 14 wherein the test step object is created using a test step definition identifying a location of a compiled set of instructions for a corresponding test step and parameters of the corresponding test step.

16. The computer readable medium of claim 12 wherein the method further comprises:

allowing a user to specify a different test engine in the test flow document; and re-running the test by the different test engine.

17. A system comprising:

a memory;

a processor coupled to the memory; and a test engine, executed from the memory by the processor, to parse a test flow document associated with a test to identify a plurality of test steps of the test and a test flow of the test, each of the plurality of test steps corresponding to an independently-compiled set of instructions;

determine dependencies between the plurality of test steps using the test flow, wherein the dependencies comprise at least one of a parallel execution dependency indicating that a second test is to be executed in parallel with a first test or a sequential execution dependency indicating that the second test depends on a result of the first test; and execute the plurality of test steps of the test using dependency injection provided in accordance with the dependencies between the plurality of test steps.

18. The system of claim 17 further comprising:

a command receiver, executed from the memory by the processor, to receive a user request to run the test, and identify the test engine for running the test.

19. The system of claim 17 wherein the test engine is to execute the plurality of test steps by:

identifying the plurality of test steps specified in the test flow document; creating a test step object for each of the plurality of test steps; and creating a test object for the test by calling a dependency injection framework to inject test step objects of the plurality of test steps into the test object, in accordance with test dependencies defined by the test flow in the test flow document.

20. The system of claim 19 wherein the test step object is created using a test step definition identifying a location of a compiled set of instructions for a corresponding test step and parameters of the corresponding test step.

21. The system of claim 20 wherein the memory is to store a list of test step definitions created by a plurality of users and stored at a plurality of locations.

22. The system of claim 18 wherein the command receiver is to receive a modified test flow document, to identify a different test engine in the modified the test flow document, and to pass the modified test flow document to the different test engine to re-run the test.

* * * * *